United States Patent
Snow

(10) Patent No.: US 6,223,770 B1
(45) Date of Patent: May 1, 2001

(54) VACUUM VALVE INTERFACE

(75) Inventor: Timothy L. Snow, Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/407,357

(22) Filed: Sep. 29, 1999

(51) Int. Cl.$^7$ ........................................... F16K 11/10
(52) U.S. Cl. ..................... 137/565.23; 137/875; 118/720
(58) Field of Search ..................... 137/565.23, 875; 118/50, 719, 720

(56) References Cited

U.S. PATENT DOCUMENTS

| | | | | |
|---|---|---|---|---|
| 3,144,035 | * | 8/1964 | Hablanian et al. | 137/565.23 |
| 4,212,317 | * | 7/1980 | Patrick et al. | 137/565 |
| 4,807,665 | * | 2/1989 | Schiel | 137/625.4 |
| 5,469,885 | * | 11/1995 | Nishimura | 137/568 |
| 5,488,967 | * | 2/1996 | Minami et al. | 137/14 |

* cited by examiner

*Primary Examiner*—A. Michael Chambers

(57) ABSTRACT

An interface for connecting a first vacuum source to a first vacuum apparatus, and for selectively connecting the first vacuum source and the first vacuum apparatus to a second vacuum apparatus without venting the first vacuum apparatus. A third fitting is connected to the first vacuum source, and makes a hermetic seal between the first vacuum source and the interface. A vacuum source line, having a first end and a second end, is connected by its first end to the third fitting. The vacuum source line receives a vacuum from the first vacuum source, and conducts the vacuum through the vacuum source line. A first tee section, having a first end and a second end, is connected by its first end to the second end of the vacuum source line. The first tee section receives the vacuum from the vacuum source line and conducts the vacuum through the first tee section. A first fitting is connected to the second end of the first tee section, and connects the first tee section to the first vacuum apparatus by making a hermetic seal between the interface and the first vacuum apparatus. The first fitting conducts the vacuum to the first vacuum apparatus. A second tee section, having a first end, a second end, and a second volume, is connected by its first end to the second end of the vacuum source line. The second tee section receives the vacuum from the vacuum source line and the first tee section and conducts the vacuum through the second tee section. The second volume of the second tee section is no greater than about two percent of the first volume of the first vacuum apparatus. A valve, having a first end and a second end, it connected by its first end to the second end of the second tee section. The valve selectively makes a hermetic seal at the second end of the second tee section, and alternately conducts at least a portion of the vacuum conducted through the second tee section. A second fitting is connected to the second end of the valve, and selectively connects the valve to the second vacuum apparatus, and makes a hermetic seal between the interface and the second vacuum apparatus.

17 Claims, 3 Drawing Sheets

VACUUM VALVE INTERFACE

FIELD

This invention relates to semiconductor processing equipment. More particularly the invention relates to a valve for use in connecting semiconductor processing equipment through their vacuum lines.

BACKGROUND

Vacuum technology is used extensively in the manufacture of semiconductor devices. One reason for this is that the components of an environment can be very closely controlled under very low pressures. In other words, by creating a vacuum and then creating a processing environment, such as by introducing a gas, the environment contains a very large percentage of the gas, and a very small percentage of any other constituents, known collectively as contaminants. In this manner, the materials being processed in the environments are exposed mostly to the gas that is introduced, and minimally to the contaminants.

In order to more tightly control the processes that are conducted within the vacuum equipment, it is desirable to gather certain information in regard to the process. Some of this information has to do with the process chamber itself, and other of the information has to do with the environment created within the process chamber. For example, the ability for a process chamber to maintain the vacuum that is drawn on the chamber is an important processing characteristic. If a chamber dissipates the vacuum too quickly, known as a high leak rate, then this situation introduces a relatively greater amount of contaminants into the chamber during a given period of time. At a certain point, a chamber with a leak rate that is too high is unfit to process semiconductor devices.

Further, it may be anticipated that during a portion of the processing of the semiconductor devices, a specific ratio of materials will be found in the effluent gases being drawn under vacuum from the processing chamber. If a different ratio is detected during processing, it might mean that there is something wrong with the process, or that the desired processing has been completed. In either case, this information is valuable to the process operator or process design engineer.

Many different types of instruments have been designed to detect the type of information described above, and many other types of information. These instruments typically operate by tapping into the process chamber in which the processing occurs, and on which the desired measurements are to be taken. Unfortunately, many process chambers are designed to remain at all times at a relatively low pressure, or in other words a relatively high vacuum, so that the chamber can be kept as free of contaminants as possible. Thus, repeatedly venting the chamber so as to insert and remove an instrument head from the chamber tends to degrade the cleanliness of the chamber, and is undesirable.

These test heads for the diagnostic instruments also create another problem. Many process chambers are designed to process a single wafer at a time, which tends to increase the uniformity of the processing across the wafer surface, and from wafer to wafer. Because of this design goal, the process chambers are relatively small. By tapping an instrument test head into the chamber, the volume of the process chamber is significantly increased. When the volume of the process chamber is altered in this manner, the process parameters themselves, such as residence time of any gases that may be introduced, are similarly effected. This creates a situation in which the reaction intended to occur within the process chamber may not proceed as anticipated.

What is needed therefore, is an apparatus for connecting a second vacuum apparatus to a semiconductor processing apparatus that does not require the chamber to vented when the second apparatus is connected and disconnected, and which does not appreciably alter the volume of the semiconductor processing chamber.

SUMMARY

The above and other needs are met by an interface for connecting a first vacuum source to a first vacuum apparatus, and for selectively connecting the first vacuum source and the first vacuum apparatus to a second vacuum apparatus without venting the first vacuum apparatus. A third fitting is connected to the first vacuum source, and makes a hermetic seal between the first vacuum source and the interface. A vacuum source line, having a first end and a second end, is connected by its first end to the third fitting. The vacuum source line receives a vacuum from the first vacuum source, and conducts the vacuum through the vacuum source line.

A first tee section, having a first end and a second end, is connected by its first end to the second end of the vacuum source line. The first tee section receives the vacuum from the vacuum source line and conducts the vacuum through the first tee section. A first fitting is connected to the second end of the first tee section, and connects the first tee section to the first vacuum apparatus by making a hermetic seal between the interface and the first vacuum apparatus. The first fitting conducts the vacuum to the first vacuum apparatus.

A second tee section, having a first end, a second end, and a second volume, is connected by its first end to the second end of the vacuum source line. The second tee section receives the vacuum from the vacuum source line and the first tee section and conducts the vacuum through the second tee section. The second volume of the second tee section is no greater than about two percent of the first volume of the first vacuum apparatus.

A valve, having a first end and a second end, it connected by its first end to the second end of the second tee section. The valve selectively makes a hermetic seal at the second end of the second tee section, and alternately conducts at least a portion of the vacuum conducted through the second tee section. A second fitting is connected to the second end of the valve, and selectively connects the valve to the second vacuum apparatus, and makes a hermetic seal between the interface and the second vacuum apparatus.

Because the second tee section only has a volume that is no greater than about two percent of the volume of the first vacuum apparatus, it does not tend to create an appreciable impact on the process conducted within the processing chamber of the first vacuum apparatus. Further, because the valve can be selectively closed between the second tee section and the second fitting, the second vacuum apparatus, which may be the test instrument, can be selectively mounted and removed from the second fitting, without venting the process chamber of the first vacuum apparatus, and thereby will not degrade the environment within the process chamber.

In various preferred embodiment of the interface, the second vacuum apparatus comprises a residual gas analyzer (RGA), a leak checker, or even another semiconductor processing apparatus. The second vacuum apparatus may also have a second vacuum source for selectively drawing a vacuum from the first vacuum apparatus through at least the second fitting, the valve, the second tee section, the first tee section, and the first fitting. Thus, the environment within the process chamber of the first vacuum apparatus can be sampled through the second tee section in this manner.

The first vacuum apparatus may be semiconductor processing equipment, such as an Applied Materials Precision 5000 plasma etcher. This piece of equipment is extremely difficult to attach an instrument to. First, the physical layout of the Precision 5000 severely restricts the locations to which an instrument may be attached. Secondly, the size of the processing chamber of the Precision 5000, and the types of processes that are conducted within it, make it extremely susceptible to volume changes, as described above. In other words, changes in the process chamber volume of the Precision 5000 of more than about two percent will have an appreciable effect on the processes conducted within it.

The first, second, and third fittings are preferably KF type fittings, such as KF25's. Alternately, the first, second, and third fittings comprise welds to the first vacuum apparatus, the second vacuum apparatus, and the first vacuum source, respectively. The vacuum source line, first tee section, and second tee section are preferably made of stainless steel pipe having a diameter of about one inch. The second tee section further preferably has a length of about one-half inch. The valve may be a gate valve, a butterfly valve, a damper valve, or another type of valve that can create a hermetic seal and can fit within the space consideration for the interface.

It is also preferred that not one of the valve, the second tee section, and the second fitting extend further from the vacuum source line in the direction of the first tee section than the first tee section does. In this manner, the interface can be mounted to the first vacuum apparatus in the place of another part that is removed.

BRIEF DESCRIPTION OF THE DRAWINGS

Further advantages of the invention will become apparent by reference to the detailed description when considered in conjunction with the figures, which are not to scale, wherein like reference numbers indicate like elements throughout the several views, and wherein.

DETAILED DESCRIPTION

Figure 1:
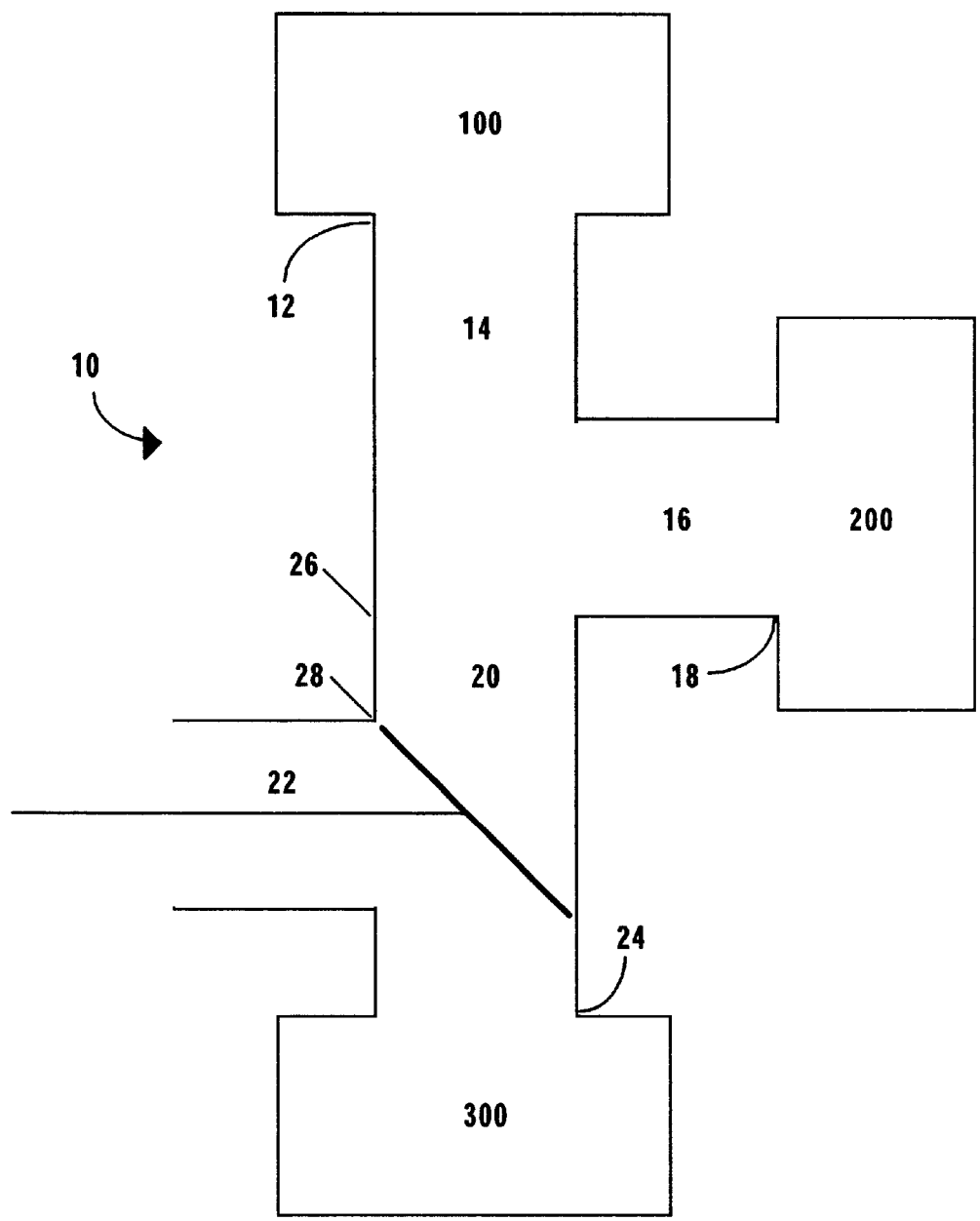
FIG. 1 depicts a functional representation of a first embodiment of the apparatus.

Referring now to FIG. 1, there is depicted a first embodiment of an interface 10 according to the present invention. The interface 10 connects first vacuum source 100 to a first vacuum apparatus 200, and selectively to a second vacuum apparatus 300. The first vacuum source 100 may be any one or more of a number of different types of vacuum sources. For example, first vacuum source 100 may be a vane pump, a turbo pump, a cryogenic pump, a diffusion pump, or a foreline leading to one of these pumps or a combination of such pumps.

The first vacuum source 100 is connected to the interface 10 by a third fitting 12. The third fitting 12 may be a weld directly between the interface 10 and the first vacuum source 100. However, the third fitting 12 is preferably a mechanical fitting that can be assembled and disassembled so that the connection between the first vacuum source 100 and the interface 10 can be selectively coupled and uncoupled as desired. The third fitting 12 preferably provides a hermetic connection between the first vacuum source 100 and the apparatus 10, so that the vacuum created by the first vacuum source 100 is not dissipated through any leaks in the third fitting 12.

In a most preferred embodiment the fitting 12 is a KF-type fitting, such as a KF25. The KF assemblies are relatively inexpensive and, depending upon the materials selected for the fitting, are compatible with soldering or brazing to standard dimensioned copper tubing or welding to common sizes of stainless steel tubes. Five components are typically used to make a complete connection using a KF fitting: two similar flanges, each of which may accommodate a slightly different diameter tube, a metal center ring that supports the o-ring and keeps the flanges in alignment, the o-ring itself, typically formed of either a natural or synthetic rubber such as Viton or Buna-N, and a clamp that, by means of a thumb screw or some other means, compresses and holds the entire assembly together.

The third fitting 12 is connected to the first end of a vacuum source line 14 of the apparatus 10. The vacuum source line 14 is preferably constructed of metal, and is most preferably stainless steel, because stainless steel is very durable and resilient in the application in which the vacuum source line 14 is employed, and additionally exhibits low out-gassing properties. While the cross-sectional shape of the vacuum source line 14 can be of any shape that supports the required characteristics of the vacuum source line 14 as described herein, in the preferred embodiment the vacuum source line 14 has a circular cross-sectional shape. The size of the vacuum source line 14 is selected to provide adequate vacuum conduction without being so large as to unduly create problems with the locations, arrangement, and sizes of the other components of the interface 10 and the equipment to which it is attached, as described herein. In a most preferred embodiment, the diameter of the vacuum source line 14 is about one inch, and the length is selected as described more completely hereafter.

The vacuum source line 14 receives the vacuum from the first vacuum source 100 and conducts the vacuum through the vacuum source line 14 to the other elements of the interface 10. It will be appreciated that the language "conducting a vacuum" is a logical construct, and does not precisely describe the physical acts taking place in the referenced process. In reality, a "vacuum is conducted" by withdrawing the fluid matter, such as a gas, within a specific initial region, such as within a vacuum pump, which creates a vacuum in the initial region. The fluid matter in any adjoining region, such as a pipe connected to the pump, will then diffuse into the initial region in which the vacuum was first created. As that matter is also withdrawn from the initial region, additional matter continues to flow into the initial region.

Thus, precisely speaking, a vacuum is not conducted, but fluid matter from adjoining regions flows toward a vacuum. If the adjoining regions are all physically contained at some point, the overall pressure within all of the adjoining regions tends to be reduced over time as the fluid matter is withdrawn. Thus, it appears as though the vacuum is conducted from the initial region through the adjoining regions, when in reality it is the fluid matter that is conducted through the adjoining regions to the initial region and removed. However, for the sake of conceptual convenience in the description provided herein, the logical construct of "conducting a vacuum" and the equivalent constructs of "receiving a vacuum" and "providing a vacuum" are used.

A first tee section 16 is connected by its first end to the second end of the vacuum source line 14. The first tee section 16 receives the vacuum drawn through the vacuum source line 14 and conducts it through the first tee section 16. The first tee section 16 is preferably constructed of metal, and is most preferably stainless steel, because stainless steel is very durable and resilient in the application in which the first tee section 16 is employed, and additionally exhibits low out-gassing properties. While the cross-sectional shape of the first tee section 16 can be of any shape that supports the required characteristics of the first tee section 16 as described herein, in the preferred embodiment the first tee section 16 has a circular cross-sectional shape. The size of the first tee section 16 is selected to provide adequate vacuum conduction without being so large as to unduly create problems with the locations, arrangement, and sizes of the other components of the interface 10 and the equipment to which it is attached, as described herein. In a most preferred embodiment, the diameter of the first tee section 16 is about one inch, and the length is selected as described more completely hereafter.

The first tee section 16 is connected at its second end to a first fitting 18. The first fitting 18 is connected to a first vacuum apparatus 200. The first vacuum apparatus 200 may also be any one of a number of different types of vacuum equipment. For example, the first vacuum apparatus 200 may be a semiconductor processing apparatus such as an evaporator, sputterer, ion implanter, or ion etcher. In a preferred embodiment the first vacuum apparatus 200 is an Applied Materials Precision 5000 plasma etcher.

In this preferred embodiment, the interface 10 replaces an elbow that is connected to the first vacuum apparatus 200. Thus, the length of the first tee section 16 and the length of the vacuum source line 14 are selected so as to match the lengths of the corresponding sections of the elbow that is replaced as closely as possible. In this manner, the process conducted within the processing chamber of the Applied Materials Precision 5000 plasma etcher is impacted to as small a degree as possible by the replacement of the elbow with the interface 10, as described more completely below.

The first vacuum apparatus 200 has a processing chamber with a first volume. As described above, the volume of the processing chamber may be relatively small, and any appreciable change to the effective volume of the vacuum apparatus 200 may significantly and detrimentally effect the process conducted within the processing chamber. In other words, the volume of a first tee section 16 and vacuum source line 14 may be accounted for in the design of the first vacuum apparatus 200 because there must be some way for a vacuum to be conducted to the first vacuum apparatus 200. However, the addition of a significant amount of unanticipated volume to this amount that has been accounted for, may tend to disrupt the predictability of the processes conducted within the first vacuum apparatus 200.

The first fitting 18 may be a weld directly between the interface 10 and the first vacuum apparatus 200. However, the first fitting 18 is preferably a mechanical fitting that can be assembled and disassembled so that the connection between the first vacuum apparatus 200 and the interface 10 can be selectively coupled and uncoupled as desired. The first fitting 18 preferably provides a hermetic connection between the first vacuum apparatus 200 and the apparatus 10, so that the vacuum conducted through the vacuum source line 14 and the first tee section 16 is not dissipated through any leaks in the first fitting 18. In a most preferred embodiment the first fitting 18 is a KF-type fitting, such as a KF25, as described above.

A second tee section 20 is also connected by its first end to the second end of the vacuum source line 14. The second tee section 20 is preferably constructed of metal, and is most preferably stainless steel, because stainless steel is very durable and resilient in the application in which the second tee section 20 is employed, and additionally exhibits low out-gassing properties. While the cross-sectional shape of the second tee section 20 can be of any shape that supports the required characteristics of the second tee section 20 as described herein, in the preferred embodiment the second tee section 20 has a circular cross-sectional shape The size of the second tee section 20 is selected to provide adequate vacuum conduction without being so large as to unduly create problems with the locations, arrangement, and sizes of the other components of the interface 10 and the equipment to which it is attached, as described herein. Other considerations in the size of the second tee section 20 are discussed in further detail below. In a most preferred embodiment, the diameter of the first tee section 16 is about one inch, and the length of the second tee section 20 from about point 26 to about point 28 is about one-half inch.

The second tee section 20 receives the vacuum drawn through the vacuum source line 14 and conducts it through the second tee section 20. The second tee section 20 has a second volume that is no greater than about two percent of the first volume of the first vacuum apparatus 200. As will be described in more detail hereafter, this small additional amount of volume will not have an appreciable impact on the processes conducted within the first vacuum apparatus 200.

A valve 22 is connected at its first end to the second end of the second tee section 20. The valve 22 can be selectively opened or closed, thus selectively making a hermetic seal at the second end of the second tee section 20 when the valve 22 is closed, and alternately conducting at least a portion of the vacuum conducted through the second tee section 20 when the valve 22 is open.

Figure 2:
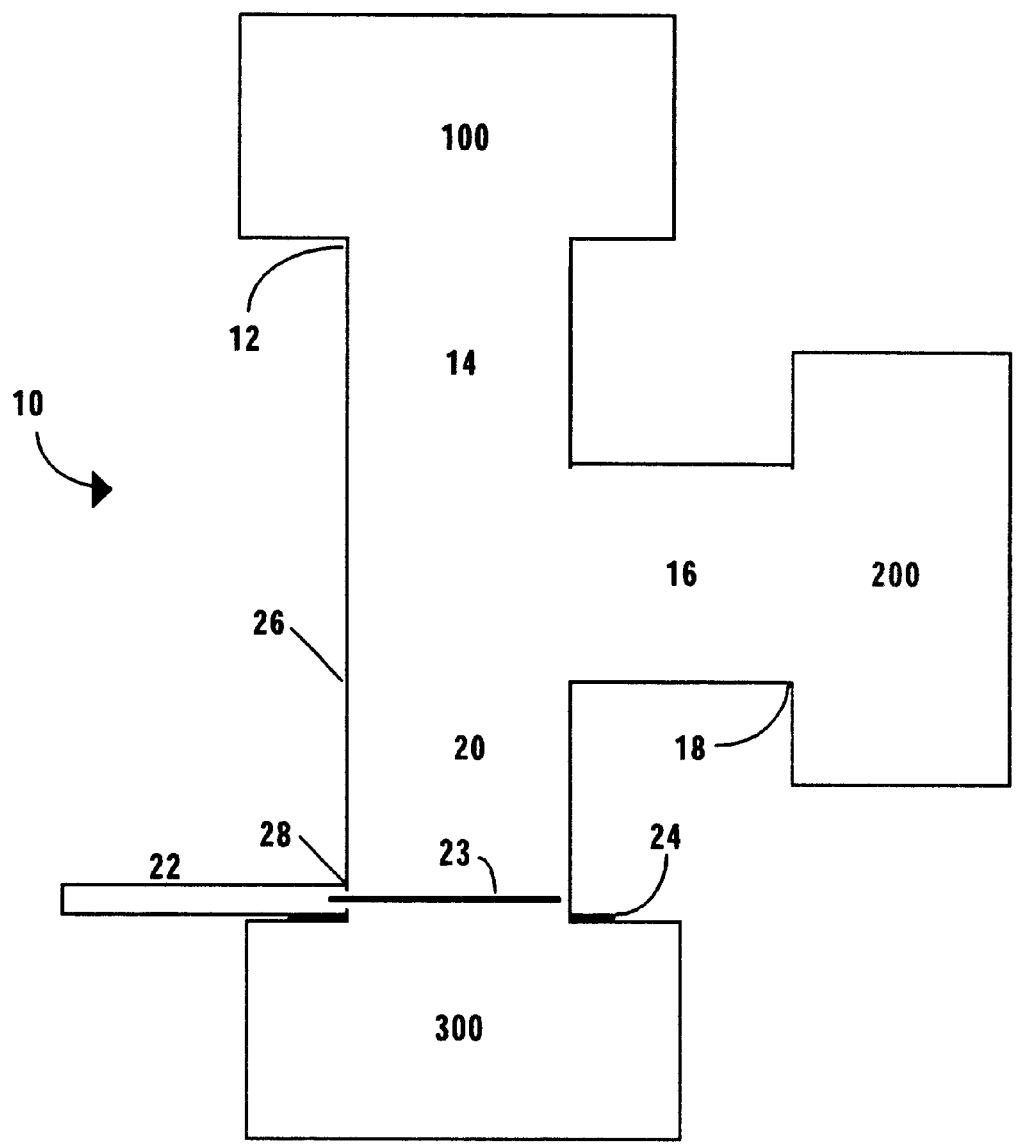
FIG. 2 depicts a functional representation of a second embodiment of the apparatus.
Figure 3:
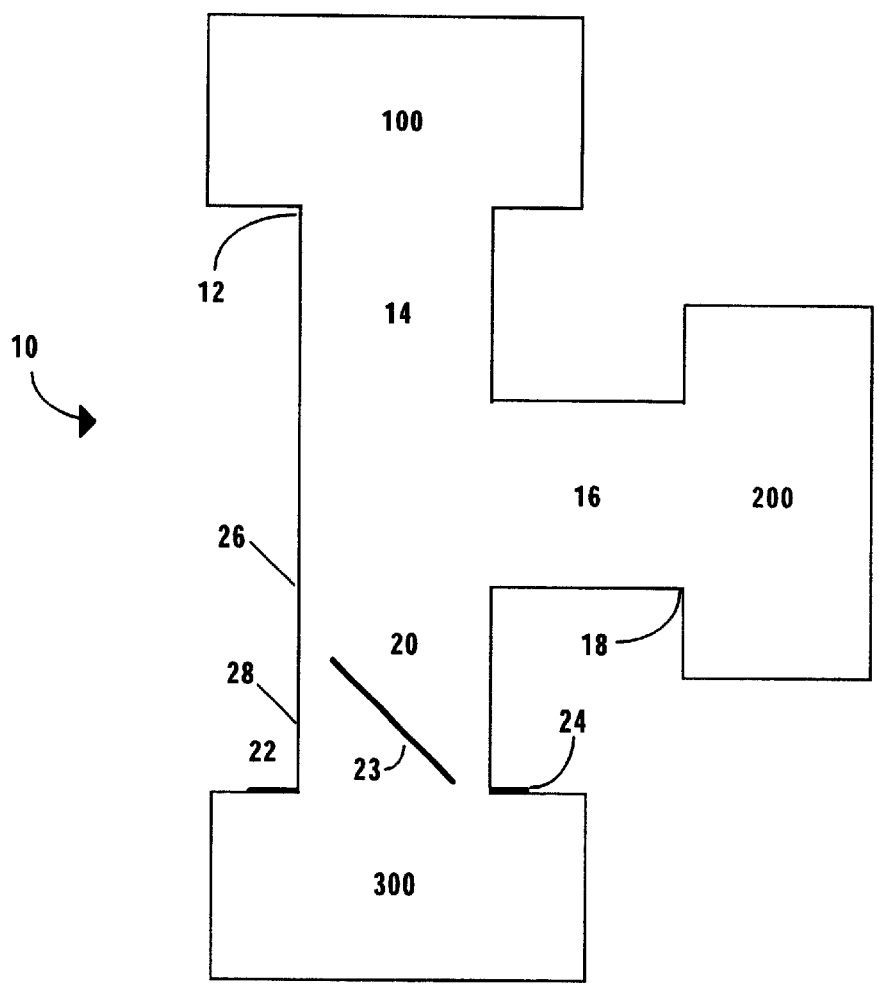
FIG. 3 depicts a functional representation of a third embodiment of the apparatus

The valve 22 may be a damper valve, such as is schematically depicted in FIG. 1, a gate valve, such as is depicted in FIG. 2, or a butterfly valve, such as is depicted in FIG. 3. It will be appreciated that the valve 22 may be selected from other types of valves known in the art, so long as the valve 22 complies with the requirements as described more completely below. The valve 22 may be manually actuated or automatically actuated.

The second end of the valve 22 is connected to a second fitting 24. The second fitting 24 is used to selectively connect the interface 10 to the second vacuum apparatus 300 via the valve 22. The second fitting 24 may be a weld directly between the valve 22 of the interface 10 and the second vacuum apparatus 300. However, the second fitting 24 is preferably a mechanical fitting that can be assembled and disassembled so that the connection between the second vacuum apparatus 300 and the interface 10 can be selectively coupled and uncoupled as desired. The second fitting 24 preferably provides a hermetic connection between the second vacuum apparatus 300 and the apparatus 10, so that the vacuum created by the first vacuum source 100 is not dissipated through any leaks in the second fitting 24.

The second vacuum apparatus 300 may also be a semiconductor processing apparatus, such as those described above, but is more preferably an instrument used to investigate the characteristics of one or both of the process or the processing chamber inside of the first vacuum apparatus 200, as described above. For example, the second vacuum apparatus 300 may be a leak detector or vacuum integrity monitor. Alternately, the second vacuum apparatus 300 may be an RGA or other mass spectrometer that is used to detect and identify the constituents of the effluent from the first vacuum apparatus 200. In an embodiment such as this, the second vacuum apparatus 300 may include a second vacuum source, that draws effluent gasses from the first vacuum apparatus 200 through the first tee section 16, through the second tee section 20, and through the valve 22.

As previously mentioned, it is an important aspect of the invention that the volume of the second tee section 20 is no greater than about two percent of the volume of the processing chamber in the first vacuum apparatus 200. It will be appreciated that there may be a portion of the volume of the valve 22 that is to be included within that two percent. As depicted in FIG. 1, there is a portion of the volume of the valve 22 below point 28 that is accessible to the second tee section 20 even when the valve 22 is closed. While in a preferred embodiment this additional volume is negligible in comparison to the volume of the second tee section 20, this additional volume in the valve 22 is preferably considered in the two percent comparison to the volume of the processing chamber.

As mentioned above, in a most preferred embodiment, the interface 10 replaces an elbow on an Applied Materials Precision 5000 plasma etcher. Thus, the sizes of the vacuum source line 14 and the first tee section 16, as well as the type of fittings used for the third fitting 12 and the first fitting 18, are selected so as to directly replace the commensurate components of the elbow that is replaced. Additionally, and due to space constraints, the other components of the interface 10 cannot extend past the second end of the first tee section 16.

In other words, the first tee section 16 is disposed as a projection that extends away from the vacuum source line 14 in a specific direction. Because other elements of the first vacuum apparatus 200 of the preferred embodiment are located past the second end of the first tee section 16 and the first fitting 18, other components of the interface 10 cannot extend further than the first tee section 16 in that direction. Specifically, the sizes of the valve 22, the second tee section 20, and the second fitting 24 are preferably all selected so as to comply with this preferred constraint.

It will be appreciated that the invention as described above comprehends numerous adaptations, rearrangements, and substitutions of parts, all of which are considered to be within the scope and spirit of the invention as described, and that the scope of the invention is only to be restricted by the language of the claims given below.

What is claimed is:

1. An interface for connecting a first vacuum source to a first vacuum apparatus, and for selectively connecting the first vacuum source and the first vacuum apparatus to a second vacuum apparatus without venting the first vacuum apparatus, comprising:
    a third fitting connected to the first vacuum source, the third fitting for making a hermetic seal between the first vacuum source and the interface,
    a vacuum source line having a first end and a second end, the first end of the vacuum source line connected to the third fitting, the vacuum source line for receiving a vacuum from the first vacuum source and conducting the vacuum through the vacuum source line,
    a first tee section having a first end and a second end, the first tee section connected to the second end of the vacuum source line at the first end of the first tee section, the first tee section for receiving the vacuum from the vacuum source line and conducting the vacuum through the first tee section,
    a first fitting connected to the second end of the first tee section, the first fitting for connecting the first tee section to the first vacuum apparatus having a first volume, the first fitting for making a hermetic seal between the interface and the first vacuum apparatus, and for conducting the vacuum to the first vacuum apparatus,
    where contiguous connections of the third fitting to the vacuum source line, of the vacuum source line to the first tee section, and of the first tee section to the first fitting provide continuous and uninterrupted fluid communication therethrough between the first vacuum source and the first vacuum apparatus,
    a second tee section having a first end, a second end, and a second volume, the second tee section connected to the second end of the vacuum source line at the first end of the second tee section, for receiving the vacuum from the vacuum source line and the first tee section and conducting the vacuum through the second tee section, the second volume of the second tee section being no greater than about two percent of the first volume of the first vacuum apparatus,
    a valve having a first end and a second end, the first end of the valve connected to the second end of the second tee section, the valve for selectively making a hermetic seal at the second end of the second tee section and for alternately conducting at least a portion of the vacuum conducted through the second tee section, and
    a second fitting connected to the second end of the valve, the second fitting for selectively connecting the valve to the second vacuum apparatus, for making a hermetic seal between the interface and the second vacuum apparatus.

2. The interface of claim 1, wherein the second vacuum apparatus comprises an RGA.

3. The interface of claim 1, wherein the second vacuum apparatus comprises a leak checker.

4. The interface of claim 1, wherein the second vacuum apparatus comprises a semiconductor processing apparatus.

5. The interface of claim 1, wherein the second vacuum apparatus further comprises a second vacuum source for selectively drawing a vacuum from the first vacuum apparatus through at least the second fitting, the valve, the second tee section, the first tee section, and the first fitting.

6. The interface of claim 1, wherein the first vacuum apparatus comprises a semiconductor processing apparatus.

7. The interface of claim 1, wherein the first vacuum apparatus comprises an Applied Materials Precision 5000 plasma etcher.

8. The interface of claim 1, wherein the first fitting, second fitting, and third fitting comprise KF25 fittings.

9. The interface of claim 1, wherein the first fitting, second fitting, and third fitting comprise welds to the first vacuum apparatus, the second vacuum apparatus, and the first vacuum source, respectively.

10. The interface of claim 1, wherein the valve comprises a gate valve.

11. The interface of claim 1, wherein the valve comprises a butterfly valve.

12. The interface of claim 1, wherein the valve comprises a damper valve.

13. The interface of claim 1, wherein the vacuum source line, first tee section, and second tee section comprise stainless steel pipe.

14. The interface of claim 1, wherein the vacuum source line, first tee section, and second tee section each have a diameter of about one inch.

15. The interface of claim 1, wherein the second tee section comprises a pipe having a diameter of about one inch and a length of about one-half inch.

16. The interface of claim 1, wherein the first tee section extends in a direction away from the vacuum source line, and none of the valve, the second tee section and the second fitting extend further than the first tee section from the vacuum source line in the direction of the first tee section.

17. An interface for connecting a first vacuum pump to a semiconductor processing apparatus, and for selectively connecting the first vacuum pump and the semiconductor processing apparatus to a leak checker without venting the semiconductor processing apparatus, comprising:

a third KF25 fitting connected to the first vacuum pump, the third fitting for making a hermetic seal between the first vacuum pump and the interface, a vacuum source line made of stainless steel pipe having a diameter of about one inch, the vacuum source line having a first end and a second end, the first end of the vacuum source line connected to the third fitting, the vacuum source line for receiving a vacuum from the first vacuum pump and conducting the vacuum through the vacuum source line, a first tee section, made of stainless steel pipe having a diameter of about one inch, the first tee section having a first end and a second end, the first tee section connected to the second end of the vacuum source line at the first end of the first tee section, the first tee section for receiving the vacuum from the vacuum source line and conducting the vacuum through the first tee section, a first KF25 fitting connected to the second end of the first tee section, the first fitting for connecting the first tee section to the semiconductor processing apparatus having a first volume, the first fitting for making a hermetic seal between the interface and the semiconductor processing apparatus, and for conducting the vacuum to the semiconductor processing apparatus, a second tee section, made of stainless steel pipe having a diameter of about one inch, the second tee section having a first end, a second end, and a second volume, the second tee section connected to the second end of the vacuum source line at the first end of the second tee section, for receiving the vacuum from the vacuum source line and the first tee section and conducting the vacuum through the second tee section, the second volume of the second tee section being no greater than about two percent of the first volume of the semiconductor processing apparatus, an isolation valve having a first end and a second end, the first end of the isolation valve connected to the second end of the second tee section, the valve for selectively making a hermetic seal at the second end of the second tee section and for alternately conducting at least a portion of the vacuum conducted through the second tee section, and a second KF25 fitting connected to the second end of the isolation valve, the second fitting for selectively connecting the valve to the leak checker, for making a hermetic seal between the interface and the leak checker.

* * * * *